March 16, 1954  R. HELMER  2,672,565

ELECTRIC CLUTCH TRANSMISSION MECHANISM

Filed April 7, 1950  4 Sheets-Sheet 1

INVENTOR
ROBERT HELMER
BY
Pennie, Edmonds, Morton & Barrows
ATTORNEYS

March 16, 1954 R. HELMER 2,672,565
ELECTRIC CLUTCH TRANSMISSION MECHANISM
Filed April 7, 1950 4 Sheets-Sheet 2

INVENTOR
ROBERT HELMER
BY
Pennie, Edmonds, Morton & Barrows
ATTORNEYS

INVENTOR
ROBERT HELMER
BY
Pennie, Edmonds, Morton & Barrows
ATTORNEYS

March 16, 1954

R. HELMER 2,672,565

ELECTRIC CLUTCH TRANSMISSION MECHANISM

Filed April 7, 1950

INVENTOR
ROBERT HELMER
BY
Pennie, Edmonds, Morton & Barrows
ATTORNEYS

Patented Mar. 16, 1954

2,672,565

UNITED STATES PATENT OFFICE 2,672,565

ELECTRIC CLUTCH TRANSMISSION MECHANISM

Robert Helmer, Great Neck, N. Y., assignor to Helmer Transmission Corporation, a corporation of Delaware Application April 7, 1950, Serial No. 154,472

8 Claims. (Cl. 310—99)

This invention relates to power transmission mechanisms for connecting a driving shaft to a driven shaft, and more particularly to mechanisms for connecting the motor or engine of a motor vehicle to the driving wheels. The invention aims to provide an improved power transmission mechanism especially adapted for use in a motor vehicle.

Throughout this specification and the appended claims the shaft connected to the source of power is called the driving shaft and the shaft to be driven thereby is called the driven shaft.

The power transmission mechanism of the invention is characterized by a slippable coupling, preferably an electromagnetic coupling device, having two relatively rotatable members, one of which is connected to the driving shaft and the other of which is rotatably mounted and connected with a gear train which in turn serves to connect the driven shaft to the driving shaft. Preferably an auxiliary reversing gear element engaging with the gear train is provided for reversing the direction of rotation of the driven shaft. The electromagnetic coupling device is advantageously in the nature of a hysteresis coupling, and it is arranged to alter the effective gear ratio of the gear train and so to change the torque of the driven shaft.

The gear train is advantageously an epicyclic gear train, and in such case is preferably of the type having two sun gears and a planetary gear train, with one of the sun gears connected to the driving shaft and the other sun gear connected to one of the members of the electromagnetic coupling device or other slippable coupling. When an epicyclic gear train is employed, one member of the slippable coupling device (e. g. the electromagnetic element of a hysteresis coupling) is secured rigidly to the driving shaft, and the other rotatably mounted member of such coupling (e. g. the magnetic or hysteresis element of the hysteresis coupling) is connected to one sun gear of the epicyclic, with the other sun gear connected to the driving shaft. The planetary gear train is operatively connected to the driven shaft, preferably through a rotatably mounted carrier for the planetary gear train, the carrier being connected to the driven shaft. The auxiliary reversing gear element, preferably a ring gear, is rotatably mounted in engagement with the planetary gear train. Means are provided for braking or holding stationary both the rotatably mounted member (i. e. the member not secured to the driving shaft) of the electromagnetic (or other slippable) coupling device and the auxiliary reversing gear element.

When the rotatably mounted member of the electromagnetic device is free to rotate under the influence of its cooperating member, the epicyclic gear train connects the driving and driven shafts in high gear ratio, and when the rotatably mounted member of the electromagnetic device is held stationary, the epicyclic gear train connects the driving and driven shafts in low gear ratio. When the two members of the electromagnetic device rotate in synchronism, the driving and driven shafts are in effect direct-connected (i. e. a gear ratio of 1:1), and the greater the relative speeds of the two members depart from synchronism, the less is the speed of the driven shaft relative to the driving shaft and the greater is the effective gear ratio of the epicyclic gear train. The direction of rotation of the driven shaft is reversed by braking or holding stationary the auxiliary reversing gear element.

The foregoing and other novel features of the power transmission mechanism of the invention will be best understood from the following description and the accompanying drawings, in which.

Figure 1:
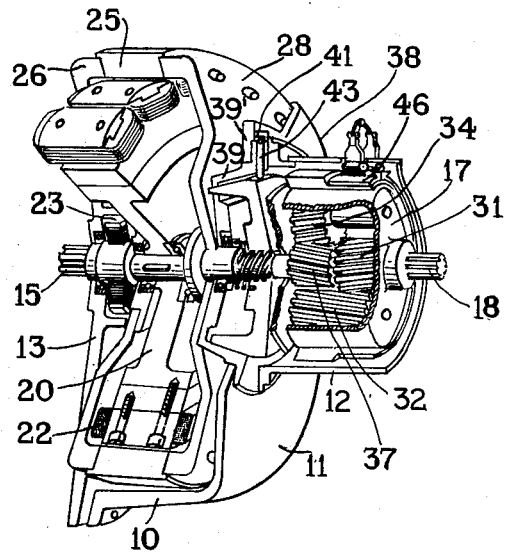
Fig. 1 is a perspective view, partly in section, of one embodiment of the power transmission mechanism.

Referring to Figs. 1 to 4, inclusive, of the drawings, the operative elements of the mechanism are supported within a casing, consisting of an outer cylindrical housing 10 having an inwardly-projecting annular flange 11 to which is bolted a cylindrical cap 12, and a plate 13 bolted to the front end of the housing. The plate 13 carries a centrally positioned ball bearing 14 for the forward end of a driving jack shaft 15 which is splined or otherwise detachably connected to the motor or other power source (not shown). The rear end of the shaft 15 is journaled at 16 in a pilot bearing formed in a gear-carrier 17 having an integral output or driven shaft 18 rotatably carried by a ball bearing 19 mounted in the rear end of the cap 12.

Figure 5:
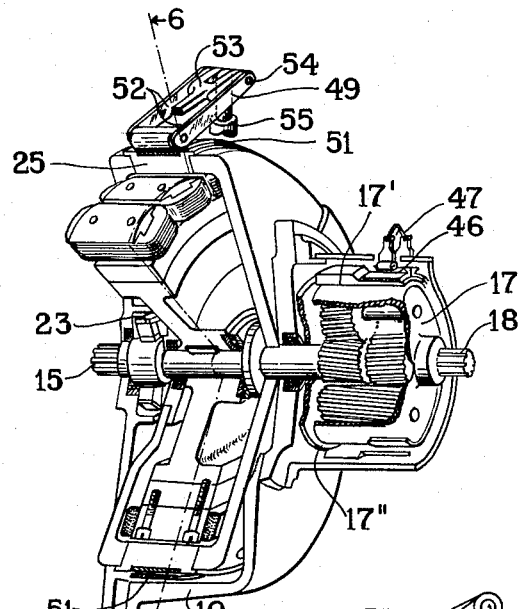
Fig. 5 is a perspective view, partly in section, of the mechanism with a modified braking means for the rotatable magnetic member.

A spider 20 is keyed to the driving shaft 15, and has bolted to its periphery a plurality of circumferentially spaced electromagnetic pole pieces 21. One terminal of the coils 22 of the pole pieces (which coils are advantageously connected together in series) is grounded and the other terminal is connected in any conventional manner to a slip ring 23 suitably mounted on the shaft 15. A stationary brush 24 contacts the slip ring and electrically connects the coils 22 to the live or ungrounded terminal of a low voltage source of electric energy, such as a generator or storage battery (Fig. 5).

A hard steel ring 25 which characteristically displays a high magnetic hysteresis loss (hereinafter called a hysteresis ring) surrounds the pole pieces 21 in coaxial but suitably spaced relation thereto. The ring 25 is rotatably mounted on the shaft 15, the ring being bolted between a front plate 26 with a cooperating ball bearing 27 (mounted on the shaft 15) and a rear plate 28 with a cooperating sleeve 29 journaled on the shaft 15. A lateral thrust bearing 30 is operatively mounted on the shaft 15 between the spider 20 and the sleeve 29. The rotatably mounted electromagnetic pole pieces 21 and surrounding hysteresis ring 25 form a slippable hysteresis coupling.

A sun gear 31 (of an epicyclic gear train) is keyed to the rear end of the driving shaft 15. The sun gear 31 meshes with a cluster of three long pinions or planet gears 32 rotatably mounted on circumferentially spaced shafts 33 mounted in the gear-carrier 17. The long pinions 32 mesh with a cluster of three short pinions or planet gears 34 rotatably mounted on circumferentially spaced shafts 35 mounted in the gear-carrier 17. The shafts 35 alternate circumferentially with the shafts 33, and all are parallel to each other and are concentrically disposed about the axis of the shaft 15 (Fig. 3). The short pinions 34 are positioned forwardly (i. e. to the left as viewed in Figs. 1 and 2) of the sun gear 31. The pinions 32 are of sufficient length to mesh with both the rearwardly mounted sun gear 31 and the forwardly mounted short pinions 34. The short pinions 34 mesh with a forward sun gear 37 rotatably mounted on the shaft 15 (adjacent to and forwardly of the rear sun gear 31). The forward sun gear 37 is secured to the sleeve 29 by which the hysteresis ring is journaled and hence rotates therewith.

Figure 2:
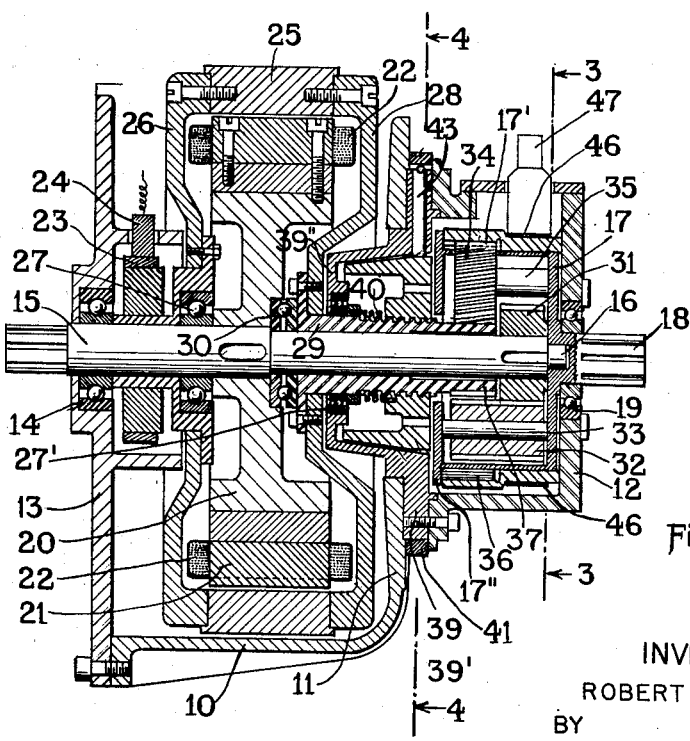
Fig. 2 is a sectional elevation of the mechanism shown in Fig. 1.
Figure 3:
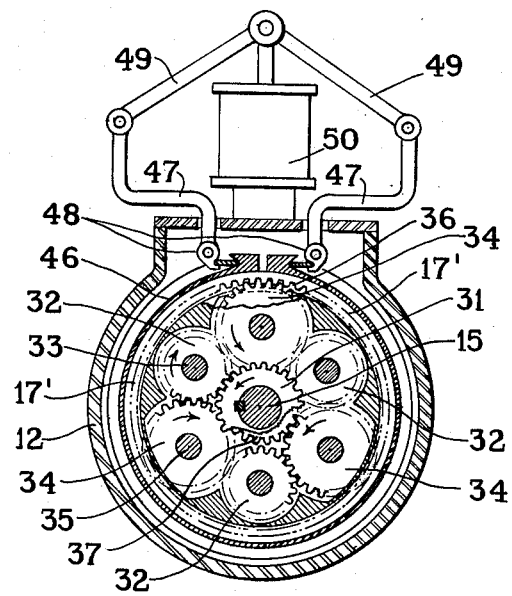
Fig. 3 is a cross section taken along section line 3—3 of Fig. 2, with some of the outer gears broken away to show the inner gears.
Figure 6:
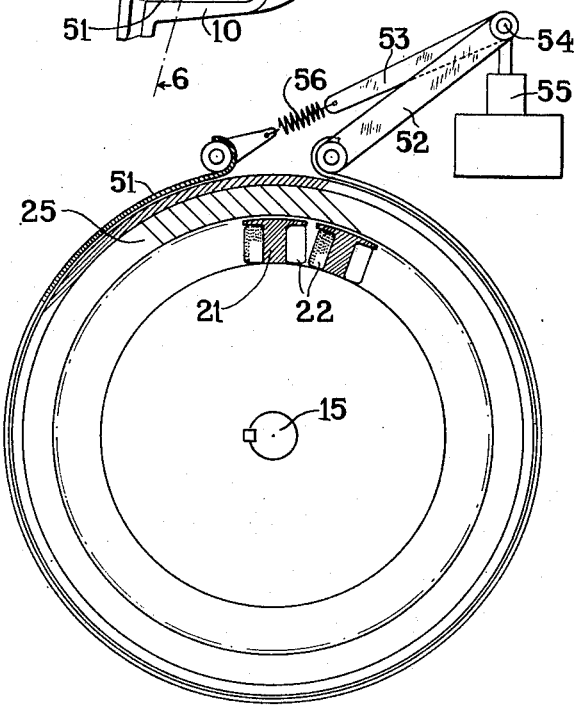
Fig. 6 is a cross section of the mechanism of Fig. 5, taken substantially as indicated by the section line 6—6 of Fig. 5.

The gear-carrier 17 is a drum-like structure with its rear end integrally secured to the driven shaft 18, and its forward end extending radially beyond its cylindrical side 17' to provide an annular flange 17'', as best shown in Figs. 1, 2 and 6. The shafts 33 and 35 are mounted between the ends of the gear-carrier, and as the planet gears walk or travel around the sun gears, their shafts travel similarly and rotate the gear-carrier 17 and attached driven shaft 18. A ring gear (or internal gear) 36, rotatably mounted on the cylindrical side 17' of the gear-carrier, meshes with the short pinions 34. The pinions 34 are of greater diameter than the pinions 32 and extend through openings in the forward portion of the cylindrical side 17' to permit engagement of the pinions with the ring gear 36. The ring gear is mounted for free rotation about the rear portion of the cylindrical side 17', and lateral displacement is prevented by the end cap 12 and the annular flange 17''.

A brake band 46 surrounds the rear portion of the ring gear 36, and when tightened holds the gear ring stationary. When the gear ring is thus braked or held stationary, the direction of travel of the planet gears 32 and 34 about the sun gears is reversed, and hence the direction of rotation of the gear-carrier 17 and the attached driven shaft 18 are reversed. Any suitable mechanism (that shown in Fig. 3 comprises a pair of levers 47 supported on pivot pins 48 and having their upper arms joined by pivotally connected toggle links 49 which may be pulled down when a solenoid 50 is energized) serves to set or tighten the brake band 46, the brake band being normally loose and the ring gear free to rotate with the gear-carrier.

Figure 4:
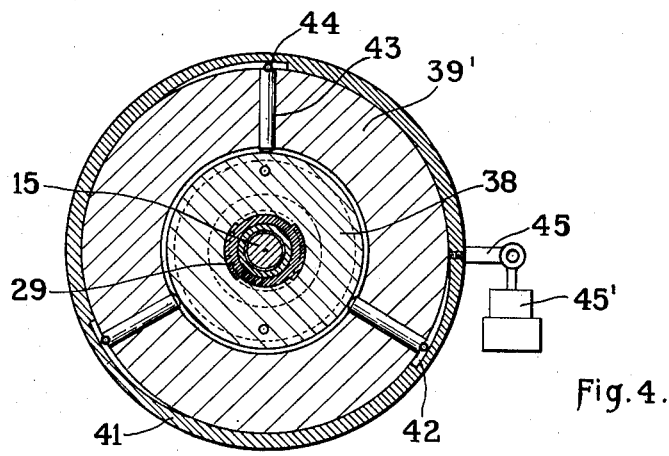
Fig. 4 is a cross section taken along section line 4—4 of Fig. 2.

In the form of apparatus shown in Figs. 1 and 2, the rear end of the sleeve 29 is threaded, and the threads engage the similarly-threaded bore of a conical brake plug, or clutch element, 38. The conical outer surface of the plug 38 is adapted to engage with and be held by the corresponding conical inner surface of a stationary brake drum (or mating clutch element) 39 having an integral annular flange 39' bolted between the annular flange 11 and the cap 12 of the housing (Fig. 2). The forward end 39'' of the drum 39 extends inwardly and carries a ball bearing 27' for supporting the sleeve 29. A coil compression spring 40 normally biases the plug 38 and drum 39 to disengaged position, and the plug then freely rotates with the sleeve 29. A brake operating ring 41 is mounted on the peripheral edge of the annular flange 39' and is adapted to be circumferentially moved through a small arc of travel. The inner surface of the ring 41 has a plurality (three as shown in Fig. 4) of circumferentially spaced internal spiral cam faces 42 of gradually increasing depth. Pins 43 having a ball bearing contact 44 with the cam faces 42 extend through circumferentially spaced radial holes in the annular flange 39' and contact, at their inner ends, the periphery of the base of the brake plug 38. The ring 41 is adapted to be turned on the flange 39' through a small arc (corresponding approximately to the arc subtended by one cam face 42) by an arm 45 secured thereto (Fig. 4) and connected to the plunger of a solenoid 45'. Turning the ring 41 (clockwise in Fig. 4) by energizing the solenoid 45' forces the pins 43 into engagement with the plug 38, thereby holding it stationary so that subsequent rotation of the hysteresis ring 25 will screw the plug (to the left in Fig. 2) along the threaded sleeve 29 into engagement with the drum 39 and the hysteresis ring will then be held stationary.

The above-described mechanism functions as follows: When the electromagnetic coils 22 are energized they create a magnetic field which permeates the hard steel hysteresis ring 25. Then when the coils 22 are rotated by the shaft 15, the high hysteresis loss characteristic of the ring urges it to rotate with the coils. Assuming the hysteresis ring thus to be rotating at the same speed as the coils (i. e., with no slipping of the ring relative to the rotating coils), the rear and forward sun gears 31 and 37 respectively will be rotating at the same speed. In this condition the train of planet gears 32, 34 must also rotate with the sun gears, and at the same speed, because of the difference in diameter of the two sun gears. Thus the planet gear carrier and the driven shaft 18 attached to it rotate at the same speed as the sun gears, and the driving and driven shafts are in effect direct-connected, or in their 1:1 high gear ratio. If there is some slipping of the hysteresis ring 25 with respect to the rotating coils 22 (i. e. if the hysteresis ring is rotating more slowly than the coils), as is the case when a sudden load is applied to the driven shaft 18, then the forward sun gear 37 will rotate more slowly than the rear sun gear 31, resulting in a reduction in the speed with which the planet gear assembly rotates around the sun gears and a corresponding reduction in the speed of rotation of the driven shaft 18 relative to that of the driving shaft 15. At the extreme where the load on the driven shaft 18 holds this shaft stationary while the driving shaft 15 (and hence the rear sun gear 31) is rotating (as when the automobile is stationary with the engine idling and the hysteresis coils de-energized), the planet gears will rotate on their axes and cause the forward sun gear 37, and the hysteresis ring 25 connected to it, to rotate in the direction opposite to that of the driving shaft at a speed determined by the relative diameters of the various gears in the epicyclic gear train. This condition corresponds to maximum slippage between the members (coils 22 and ring 25) of the hysteresis coupling.

The foregoing operation occurs only when the brake plug 38 is out of engagement with its mating brake drum 39 and when the hysteresis coils are de-energized. Assume now that the coils 22 are de-energized and the brake plug has been screwed into tight engagement with the stationary drum. In this condition the hysteresis ring 25 and the forward sun gear 37 are restrained from rotating at all. Therefore rotation of the rear sun gear 31 by the driving shaft 15 causes the planet gears to walk around gear 37 in the same direction as it (31) rotates, but at a reduced speed because the forward sun gear is stationary. Since the planet gears can now react against the forward sun gear, the driven shaft 18 is enabled to deliver an increased torque to the load connected to it. This condition (where the brake plug 38 and brake drum 39 are in tight engagement) corresponds to the low gear ratio of the transmission unit in which it can deliver maximum power to the load.

In both high gear and low gear forward drives described above, the ring gear 36 floats freely and rotates in the same direction as the sun gears. If the brake band 46 is tightened (by energization of the solenoid 50), the ring gear is restrained from rotation, and with the rear sun gear 31 being rotated by the driving shaft 15, the planet gears are forced to walk around the rear sun gear in a direction opposite to its own direction of rotation. This is the reverse gear condition of the transmission, in which the driven shaft is rotated in the opposite direction to the driving shaft. In this condition, of course, the hysteresis coils 22 are de-energized and the brake plug 38 is disengaged from the brake drum 39. In reverse gear, the forward sun gear and the hysteresis ring are rotated in the reverse direction to and at a higher speed than the driving shaft, but since the coils 22 are not energized and the brake or clutch unit 38, 39 is disengaged, the hysteresis ring and forward sun gear rotate in a simple free floating relation to the driving shaft.

In the modification shown in Figs. 5 and 6 of the drawings, the hysteresis ring 25 is mechanically braked by a brake band 51 adapted to be set or tightened about the hysteresis ring by a toggle linkage comprising a pair of levers 52 and 53 pivotally connected together at one end by a pin 54 and connected at their other ends respectively to the opposite ends of the brake band 51. The brake band is tightened about the outer periphery of the hysteresis ring 25 by a solenoid 55 which pulls down on the pivotally connected ends of the levers. A tension spring 56 is used in connecting one of the levers 53 to the brake band in order to give a smooth braking effort. In this modification of the mechanism, the brake plug 38, the brake drum 39, and their cooperating elements are replaced by the brake band 51 and its actuating linkage. The solenoid 55 takes the place of the solenoid 45' previously mentioned. The brake band 51 performs the function of the brake plug 38, and otherwise the modified apparatus functions in the same manner as the apparatus described above with reference to Figs. 1 to 4.

While solenoids have been described herein as the actuating means for the brake bands 46 and 51 and for the ring 41, any other suitable means may be used for actuating these elements, such for example as vacuum devices operated by the vacuum of a gasoline engine intake manifold.

Figure 7:
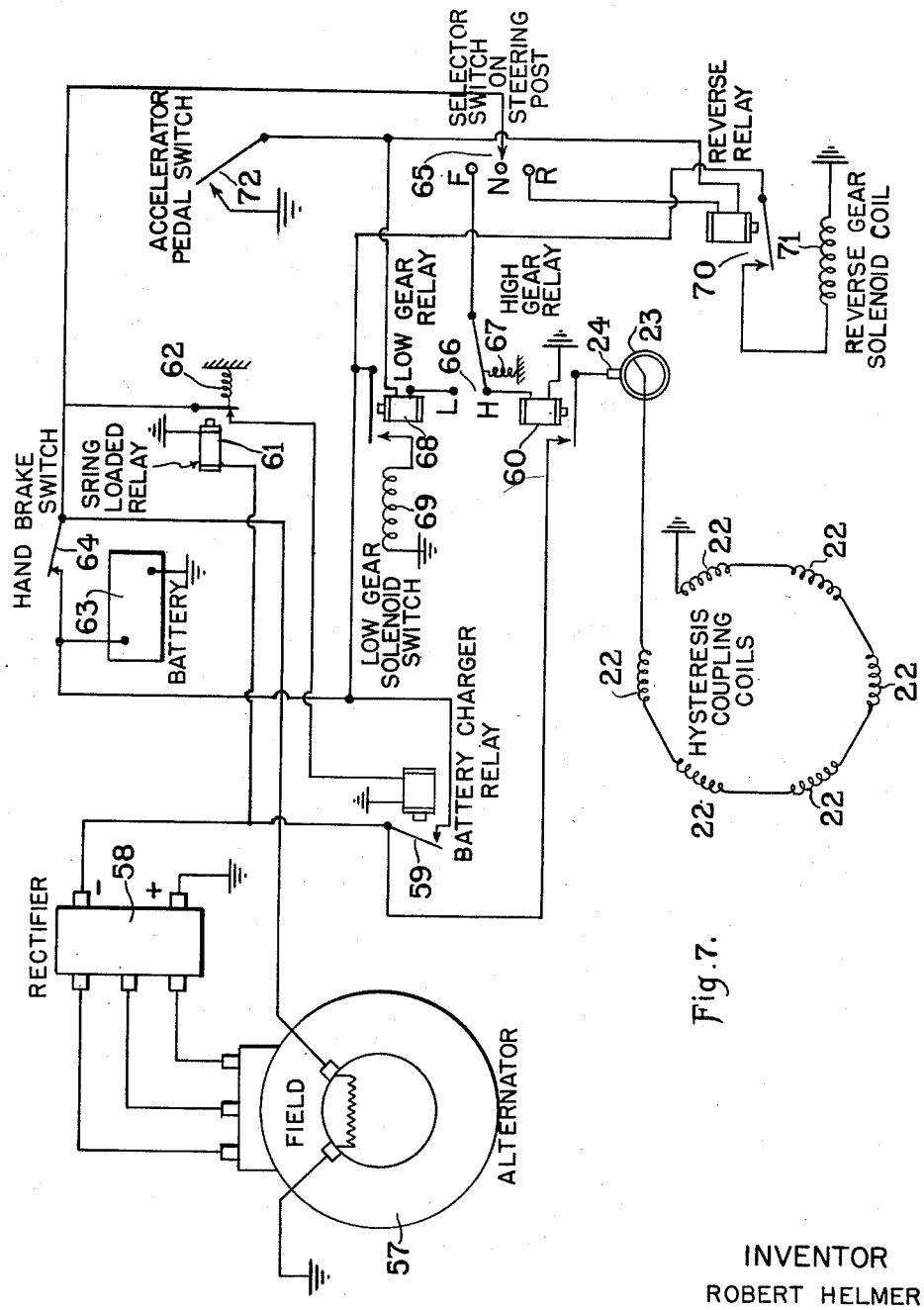
Fig. 7 is a diagram of the electric circuits for the mechanism, in which the control devices are diagrammatically indicated.

The operation of the mechanism as it may be installed in an automobile will best be understood by reference to the electrical circuit diagram of Fig. 7. The driving shaft 15 is connected to the engine and the driven shaft 18 is connected to the drive wheels through the usual universal joint, propeller shaft, differential gear, and axles. A three-phase alternator 57, driven by the automobile engine, is electrically connected to a rectifier 58 designed to deliver direct current electric energy of low voltage (e. g. 6-7 volts). One side of the rectifier is grounded, and its other (live) side is connected to one contact of a battery-charger relay 59 and also to one contact of a high gear relay 60. The other contact of this relay is connected (through the brush 24 and slip ring 23) to the ungrounded terminal of the coils 22 of the hysteresis coupling. Further, the live terminal of the rectifier is connected to the ungrounded side of the actuating coil of a relay 61 having its contact arm loaded by a spring 62 which prevents the relay contacts from closing until the alternator is rotating at sufficient speed to deliver the full charging voltage required to charge a storage battery 63. When this voltage is developed, the contacts of relay 61 close, thereby connecting the actuating coil of the charger relay 59 across the battery and effecting delivery of charging current to the battery from the rectifier through the contacts of the charger relay.

The battery is connected through a normally closed hand brake switch 64 to the moving contact arm of a selector switch 65 having forward (F) and reverse (R) contacts and advantageously also a neutral (N) position. The hand brake switch is mounted so as to be opened when the hand brake is set. The selector switch is advantageously mounted on the steering column adjacent the steering wheel of the automobile.

The forward (F) contact of the selector switch is connected to the movable arm of a low-high gear selector switch 66 which is normally biased by a spring 67 into contact with the high gear (H) terminal of this switch. This (H) terminal of the low-high switch is connected to the ungrounded terminal of the actuating coil of the high gear relay 60. The low gear (L) terminal of the low-high switch is connected to one side of the actuating coil of a low gear relay 68, the contacts of which serve to open or close a circuit from the battery to ground through the actuating coil 69 of the low gear brake solenoid (45' in the apparatus of Figs. 1 to 4 or 55 in the apparatus of Figs. 5 and 6). The low-high gear selector switch 66 is advantageously located on the floorboard of the automobile in position where its movable arm can be shifted from its normal position in engagement with the high (H) terminal to engagement with the low (L) terminal by a simple movement of the left foot of the automobile driver.

The reverse (R) terminal of the selector switch 65 is connected to one side of the actuating coil of a reverse gear relay 70, the contacts of which serve to open or close a circuit from the battery to ground through the actuating coil 71 of the reverse gear brake solenoid 50. The circuit through the actuating coil of the reverse gear solenoid 70, and also through the actuating coil of the low gear solenoid 68, is completed to ground through a normally open accelerator pedal switch 72 mounted adjacent the accelerator pedal in such position that it remains open so long as no pressure is exerted by the driver's foot on the accelerator pedal, but so that it is closed when the accelerator pedal is depressed beyond some very small initial movement.

In starting, the hand brake is on, keeping the hand brake switch 64 open. Consequently the circuit to the selector switch 65 is open, and none of the control relays 60, 68 or 70 can become energized. The engine now may be warmed up by stepping on the accelerator pedal without giving either forward or reverse motion to the automobile. The same may be done if the selector switch is in the neutral (N) position even though the hand brake be released and the hand brake switch 64 thereby be closed.

To start the automobile in the forward direction, the hand brake is released and the arm of the selector switch 65 is moved to make contact with its forward (F) terminal. The automobile may now be started forward in direct drive (high gear) by simply stepping on the accelerator pedal, for the high gear relay is now energized and the circuit between the rectifier 58 and the coils 22 of the hysteresis coupling is completed through the high gear relay contacts. When the automobile engine is turning over only at idling speed, the voltage produced by the alternator 57 is so low as to be negligible, and the output of the rectifier is correspondingly low. As the engine speed increases, the alternator (and rectifier) voltage output correspondingly increases until at some minimum engine speed the alternator voltage attains its full rated value. This increase of alternator voltage with increasing engine speed is of advantage, for as the car starts and the engine speed increases, the amount of current flowing through the coils of the hysteresis coupling increases with the alternator voltage, thereby gradually increasing the strength of the electromagnetic coupling and leading to smoother acceleration than would result if maximum or near-maximum voltage were impressed on the coils 22 at the moment of starting. Since the battery charger relay is open until the rectified alternator voltage has attained substantially its full value, the battery voltage is not applied to the coils 22 during the initial period of acceleration from engine idling speed.

To start in low gear, the selector switch 65 is moved to the forward (F) position and the high-low gear selector switch is actuated to place its spring-loaded arm in contact with the low gear (L) terminal. Then, when the accelerator pedal is depressed and the switch 72 connected thereto is closed, the low gear relay 68 is energized with resulting energization of the low gear solenoid coil 69. This results in engaging either the brake plug 38 with its drum 39 (in the apparatus of Figs. 1 to 4) or the brake band 51 with the hysteresis ring 25 (in the apparatus of Figs. 5 and 6). At the same time the high gear relay is de-energized, so that the coils of the hysteresis coupling 22 are likewise de-energized. Hence the transmission operates in low gear in the manner already described. The accelerator pedal switch 72 is included in the low gear relay circuit so that the automobile can be stopped completely in low gear by simply releasing the accelerator pedal without moving the selector switch 65 from the forward (F) position or releasing the high-low selector switch 66 from the low (L) position. In low gear, with the brake plug 38 or the brake band 51 positively restraining the hysteresis ring 25 and forward sun gear 37 from rotation, the driving and driven shafts are positively connected together. The accelerator pedal switch permits releasing the brake on the hysteresis ring assembly, and so permits the engine to turn over at idling speed, without manipulating either the selector switch 65 or the high-low selector switch 66.

To start the automobile in reverse gear, the arm of the selector switch 65 is moved to the reverse (R) position. Then when the accelerator pedal is depressed enough to close the accelerator pedal switch 72, the reverse relay is energized, whereby the circuit through the coil 71 of the reverse gear solenoid 50 is completed. This results in tightening of the brake band 46 about the ring gear 36, so that the transmission operates in reverse gear as previously described. With the selector switch 65 in the reverse (R) position, neither the high gear relay 60 nor the low gear relay 68 can be energized. The accelerator pedal switch 72 functions in connection with the reverse gear relay 70 in the same manner as it does in connection with the low gear relay 68 to permit the engine to turn over at idling speed without moving the selector switch from the reverse (R) position (for in reverse gear with the brake band 46 restraining the ring gear 36 from rotation, the driving and driven shafts of the transmission mechanism are positively connected together).

If pneumatic or vacuum control devices are used in place of the solenoids 45', 50 and 55 herein described, the contacts of the relays 68 and 70 are connected to electrically operated valves through which such devices are themselves controlled; or if such valves are of a type that do not require a very high current to operate them, they may be connected directly in place of the relays and the relays themselves may be omitted altogether.

Although the new transmission has been described with particular reference to its use in an automobile, it is obvious that it may be used elsewhere in many types of apparatus requiring a power transmission unit between the source of power and the load.

The power transmission mechanism of the invention is simple and rugged in construction and easily controlled by a minimum of manual or other operations. Power is transmitted efficiently and smoothly from the driving shaft to the driven shaft, and the hysteresis coupling enables the epicyclic gear train to operate at progressively varying effective gear ratios, with adequate torque at all gear ratios for ordinary conditions of use, such as starting, accelerating, ascending grades, etc. In low gear and reverse gear, a high degree of torque multiplication is available for driving conditions demanding a maximum of power. The mechanism is compact and occupies comparatively little space, is easily assembled and disassembled for inspection and repair. The constructions herein illustrated and described are now considered the best embodiments of the new transmission, but it will be understood that it is susceptible of various modifications without departing from the principle and spirit of the invention.

I claim:

1. A device for drivingly connecting two rotatable members, comprising two parts connected respectively to said members, one of said parts comprising an annular series of alternate north and south pole pieces, each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material, the inner periphery of which surrounds and is positioned closely adjacent the arcuate outer faces of the pole shoes and which ring forms the sole path for magnetic flux generated by said pole pieces; said second part constituting a driven member; a driving shaft connected to said driving member; a driven shaft connected to said driven member; an epicyclic gear train having two sun gears and a planetary gear train; one of the sun gears being connected to said driving shaft and the other sun gear being connected to said driven member; the sun gears and planetary gears of the epicyclic gear train having a ratio such that a large portion of the torque delivered to the driven shaft is derived directly from the driving shaft through the planetary gear train, and a small portion of the torque delivered to the driven shaft is derived through the magnetic coupling.

2. A device for drivingly connecting two rotatable members, comprising two parts connected respectively to said members, one of said parts comprising an annular series of alternate north and south pole pieces, each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces; said second part constituting a driven member; a driving shaft connected to said driving member; an epicyclic gear train connecting said driving shaft and said driven member to said driven shaft, having two sun gears, one of the sun gears being connected to said driving shaft and the other sun gear being connected to said driven member, the sun gears and planetary gears of the epicyclic gear train being arranged such that part of the torque delivered to the driven shaft is derived directly from the driving shaft and rear sun gear and part from said driven member and forward sun gear.

3. A device for drivingly connecting two rotatable members, comprising two parts connected respectively to said members, one of said parts comprising an annular series of alternate north and south pole pieces, each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces, said second part constituting a driven member; a driving shaft connected to said driving member; an epicyclic gear train connecting said driving shaft and said driven member to said driven shaft, and means for holding said magnetic member stationary, said gear train having two sun gears, one of the said sun gears being connected to said driving shaft and the other sun gear being connected to said driven member; the sun gears and planetary gears of said epicyclic gear train arranged so that when used in conjunction with a slippable magnetic coupling will provide the driven shaft with a discrete number of torque ratios and an infinite series of speed ratios.

4. A device for drivingly connecting two rotatable members, comprising two parts connected respectively to said members; one of said parts comprising an annular series of alternate north and south pole pieces, each having a pole shoe thereon extending circumferentially beyond the pole piece all of which shoes have arcuate outer faces, the adjacent edges of each pair of adjacent pole shoes being closely adjacent, and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces, said second part constituting a driven member; a driving shaft connected to said driving member; an epicyclic gear train having two sun gears and a planetary gear train, one of said sun gears being connected to said driving shaft and the other sun gear being connected to said driven member and the planetary gear train being connected to said driven shaft, a rotatably mounted gear element operatively associated with said planetary gear train, braking means for said magnetic member, and braking means for said gear element.

5. A device for drivingly connecting two rotatable members, comprising two parts connected respectively to said members, one of said parts comprising an annular series of alternate north and south pole pieces each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces, said second part constituting a driven member; a driving shaft connected to said driving member; an epicyclic gear train having two sun gears and a planetary gear train, one of said sun gears being connected to said driving shaft and the other sun gear being connected to said driven member; a carrier for said planetary gear train rotatably mounted on the driving shaft and connected to said driven shaft; a ring gear rotatably mounted on the driving shaft and operatively connected to said planetary gear train; and means for holding said driven member stationary and thereby establish a low gear ratio between said driving and driven shafts, and means for holding said ring gear stationary and thereby reversing the direction in which said planetary gear carrier rotates said driven shaft.

6. A device for drivingly connecting two rotatable members, comprising two parts connected respectively to said members, one of said parts comprising an annular series of alternate north and south pole pieces each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces, said second part constituting a driven member; a driving shaft connected to said driving member the foregoing constituting a slippable coupling drive; an epicyclic gear train connecting the driven shaft to the driving shaft, said epicyclic gear train comprising forward and rear sun gears and a planetary gear train engaging with both of said sun gears, said rear sun gear being connected to the driving shaft and said planetary gear being connected to the driven shaft, said slippable coupling device having two relatively rotatable members one of which is connected to said driving shaft and the other of which is connected to said forward sun gear for altering the effective gear ratio of said epicyclic gear train when the relative speeds of rotation of the members of the coupling device are changed, and an auxiliary gear element engaging with said epicyclic gear train for reversing the direction of rotation of the driven shaft.

7. A device for drivingly connecting two rotatable members, comprising two parts connected respectively to said members, one of said parts comprising an annular series of alternate north and south pole pieces each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces, said second part constituting a driven member; a driving shaft connected to said driving member; an epicyclic gear train connecting said driving shaft and said driven member to said driven shaft, having two sun gears, one of the sun gears being connected to said driving shaft and the other sun gear being connected to said driven member, the sun gears and planetary gears of the epicyclic gear train being arranged so that said first member acts as a control member, providing large amounts of torque to the driven shaft, while transmitting very little torque between the driving and driven members of said first member.

8. A device for drivingly connecting two rotatable members, comprising two parts connected respectively to said members, one of said parts comprising an annular series of alternate north and south pole pieces each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, said pole pieces, pole shoes and electrical means constituting a driving member; the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces, said second part constituting a driven member; a driving shaft connected to said driving member; an epicyclic gear train connecting said driving shaft and said driven member to said driven shaft and means for providing said driven member with unidirectional rotary motion, said gear train having two sun gears, one of said sun gears being connected to said driving shaft, and the other being connected to said driven member, the sun gears and planetary gears of said epicyclic gear train being arranged to provide torque division between the epicyclic gear train and the driving and driven members of said first member.

ROBERT HELMER.

References Cited in the file of this patent

UNITED STATES PATENTS

| Number | Name | Date |
|---|---|---|
| 711,300 | Earle | Oct. 14, 1902 |
| 782,547 | Coffee | Feb. 14, 1905 |
| 1,307,230 | Von Zweibergk | June 17, 1919 |
| 1,359,616 | Murray | Nov. 23, 1920 |
| 1,619,703 | Charlton | Mar. 1, 1927 |
| 2,050,185 | Kibler | Aug. 4, 1936 |
| 2,583,523 | Winther | Jan. 22, 1952 |
| 2,603,678 | Helmer | July 15, 1952 |

FOREIGN PATENTS

| Number | Country | Date |
|---|---|---|
| 426,368 | Great Britain | Apr. 2, 1935 |